Sept. 7, 1926.

H. E. JAYNES 1,598,726

ADJUSTABLE DRILL AND COUNTERBORING TOOL

Filed Feb. 12, 1926 2 Sheets-Sheet 1

INVENTOR.
Howard E Jaynes
BY
S. E. Thomas
ATTORNEY.

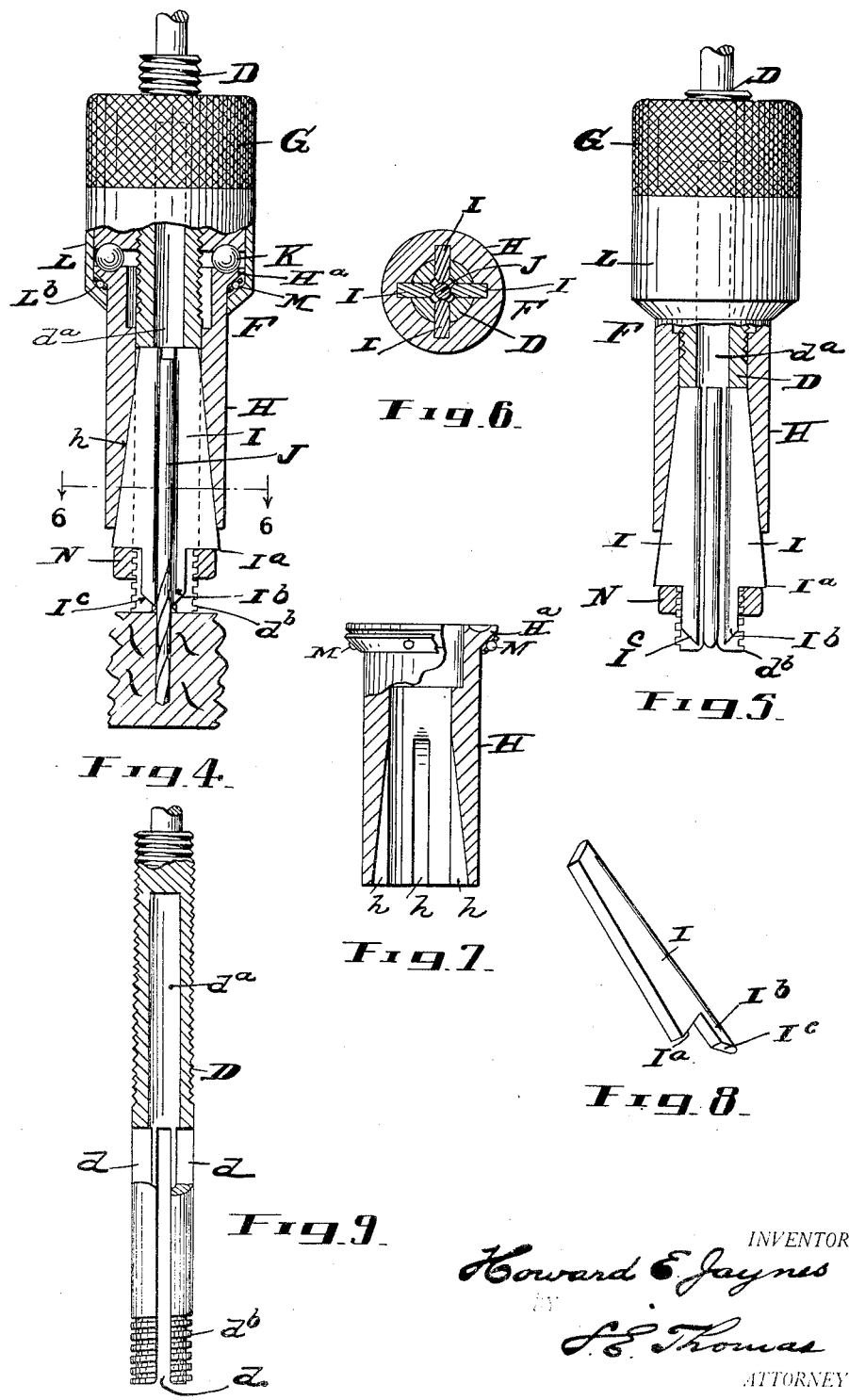

Patented Sept. 7, 1926.

1,598,726

UNITED STATES PATENT OFFICE.

HOWARD E. JAYNES, OF DETROIT, MICHIGAN.

ADJUSTABLE DRILL AND COUNTERBORING TOOL.

Application filed February 12, 1926. Serial No. 87,758.

My invention relates to an adjustable drill and counter-boring tool shown in the accompanying drawings and more particularly described in the following specification and claims.

This invention is especially designed for woodworkers use,—it may however be employed as a metal working tool.

One of the objects of this invention is to provide an adjustable drill and counter-boring tool which may be readily adjusted to receive and grip drills of varying diameter to bore either a plain hole to receive round-head screws or a hole and counter-bore to receive a flat screw flush with the surface of the wood, or a hole and counter-bore of sufficient depth to receive the head of a flat screw to be covered by a wood veneer or other means for concealing the screw;—the hole and counter-bore being completed in a single operation.

A further object of the invention is to provide means whereby the depth of the hole bored and also the depth of the counter-bore may be controlled.

While this device is shown in connection with a hand-drill, it may also be used with a breast, post drill, or other suitable actuating means.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 4 is a side elevation of the device partly in section showing the adjustment of the drill and counter-bore cutter with reference to the end of the slotted spindle, to limit the depth of the bore.

Figure 5 is a similar sectional view showing the device adjusted to receive a drill of relatively larger diameter.

Figure 6 is a cross sectional view taken on or about line 6—6 of Figure 4.

Figure 7 is a detail cross sectional view through the rotatable sleeve with parts in elevation showing the grooves in the sleeve to receive the drill gripping jaws and integral counter-bore cutters.

Figure 8 is a perspective view showing one of the combined drill gripping jaws and counter-bore cutters.

Figure 9 is a sectional elevation of the tubular slotted spindle, with parts broken away.

Referring now to the letters of reference placed upon the drawings:

A denotes the grip or handle of a hand-drill. B is its driving gear in mesh with a pinion C mounted on the shank of a screw threaded spindle D journaled in the sleeve E of the supporting frame. $B^1$ is a crank for manually actuating the gear. F indicates a chuck including a milled head G tapped to receive the spindle D on which the head is longitudinally adjusted by manually turning the latter. H denotes a rotatable sleeve with a tapering bore and inclined grooves to receive a plural number of jaws I adapted when adjusted to grip the shank of a drill J. The outer end of the jaws are provided with a shoulder $I^a$ and an extension $I^b$ terminated in an inclined cutting edge $I^c$ for cutting counter-bores. The spindle D has a plurality of slots $d$ at its lower end to receive the jaws I which project through the slots into the inclined grooves $h$ of the sleeve H as previously explained. The spindle D has also a central bore $d^a$ to receive the shank of the drill J when adjusted longitudinally with reference to the counter-boring end of the jaws I. K denotes a plurality of balls lodged in opposing annular grooves respectively formed in the milled head G and the upper end of the rotatable sleeve. The sleeve H has a projecting flange with an inclined underface $H^a$, or ball race. L is a collar secured to the head C by screws $L^a$ which projecting beyond the end of the head G is inclined as at L^b to correspond with the inclined underface of the flange of the sleeve H,—between which are lodged ball bearings M. The lower slotted end of the spindle D is provided with a square cut screw thread $d^b$, on which is mounted a nut N adapted when adjusted to bear against the shoulders I^a of the respective jaws I thereby insuring the alignment of the counter-bore cutting edges I^c, at the end of the jaws. The outer face of the nut may also serve with the end of the spindle to limit the depth of the counter-bore by contact with the surface surrounding the latter.

Having now indicated the several parts by reference letters the construction and operation of the device will be readily understood.

When it is desired to drill a hole to receive a round headed screw the integral gripping jaws and counter-bore cutters are adjusted with reference to the drill so that the cutting end E^c of the jaws are lodged within the slotted end of the spindle D, as shown in Figures 4 and 5, that the cutting ends of the jaws may not enter the wood.

Figure 1:
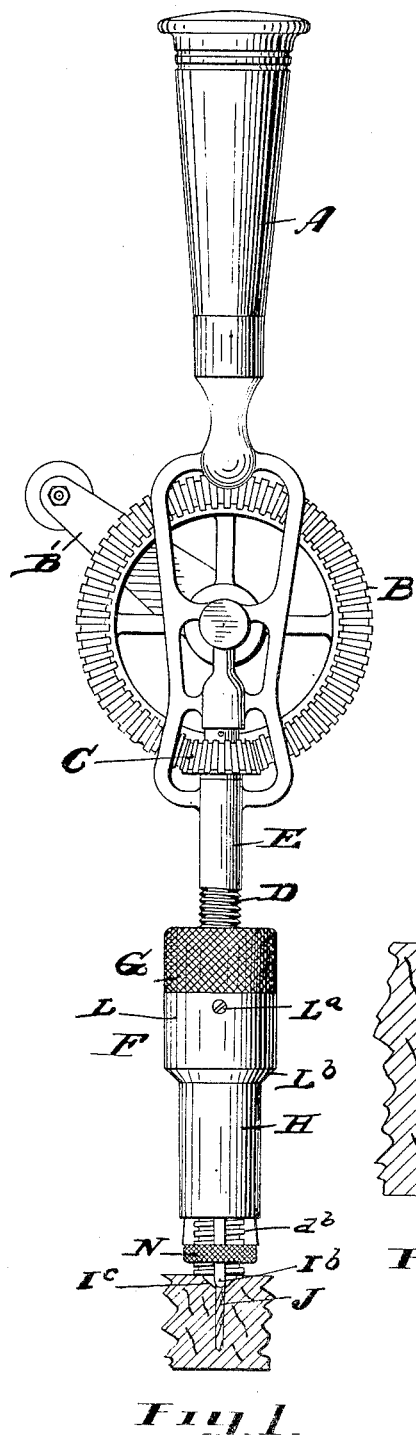
Figure 1 is a side elevation of the device as it would appear when drilling a hole and counter-bore for a flat headed screw.
Figure 2:
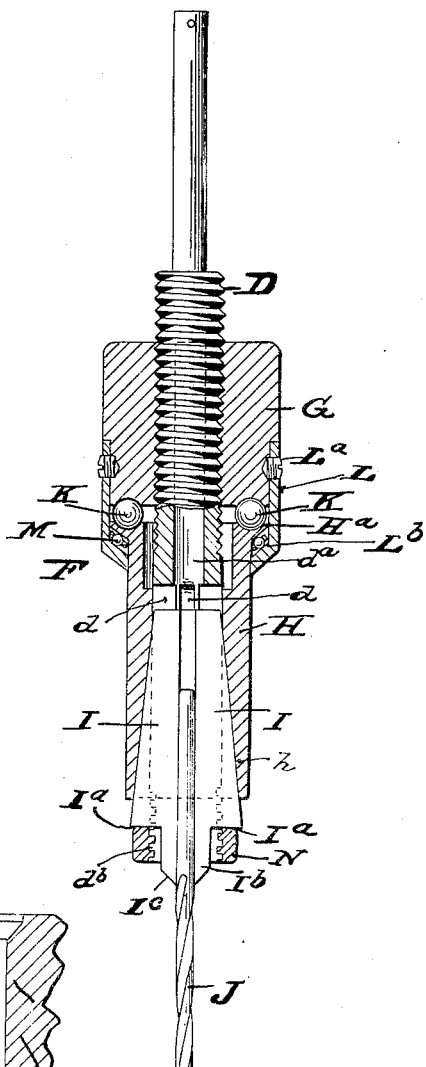
Figure 2 is a vertical sectional view through the device shown in Figure 1 with the cutters of the counter-bore adjusted so as to cut a deep seated counter-bore for a flat headed screw to be afterwards covered by a veneer or other means for concealing same.
Figure 3:
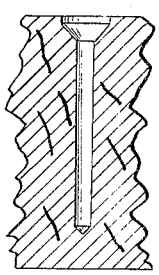
Figure 3 is a cross sectional view through a wooden member bored to receive a screw and counter-bored for the head of the screw and covering veneer,—provided for by the adjustment of the device as shown in Figure 2.

When it is desired to drill and counter-bore, the nut N and milled head G are adjusted outwardly upon the spindle until the cutting ends of the jaws project beyond the end of the spindle sufficiently to provide for cutting a counter-bore of proper depth—the depth of the counter-bore being limited through contact of the end of the spindle—see Figure 1—with the surrounding surface of the wood.

Having thus described my invention what I claim is:

1. In a device of the character described; a spindle provided with a central bore slotted to receive a plurality of jaws; a rotatable head screwed upon the spindle adapted for longitudinal adjustment thereon; a slidable sleeve provided with a plurality of inclined longitudinal grooves and coupled to the rotatable head for longitudinal adjustment upon the spindle; a plurality of blades lodged respectively in the slots of the spindle having an inclined edge extending into the inclined grooves of the sleeve with a cutting edge at the end of said blades, adapted to cut a counter-bore and; a nut screwed upon the end of the spindle adapted to be adjusted against a shoulder formed in the cutting blades to secure them in the slidable sleeve.

2. In a device of the character described; a spindle provided with a central bore slotted to receive a plurality of jaws; a rotatable head screwed upon the spindle adapted for longitudinal adjustment thereon; a slidable sleeve provided with a plurality of inclined longitudinal grooves and coupled to the rotatable head for longitudinal adjustment upon the spindle; ball bearings between the end of the head and the slidable sleeve; a plurality of blades lodged respectively in the slots of the spindle having an inclined edge extending into the inclined grooves of the sleeve with an extension forming a shoulder at the end of the inclined edge of the blades also a cutting edge at the end of said extension, adapted to cut a counter-bore; a nut screwed upon the end of the spindle and against the shoulder of said jaws.

3. In a device of the character described; a spindle provided with a central bore slotted to receive a plurality of jaws; a rotatable head screwed upon the spindle adapted for longitudinal adjustment thereon; a slidable sleeve provided with a plurality of inclined longitudinal grooves and a projecting flange at its upper end; a collar secured to the rotatable head with an inwardly directed flange overlapping the flange of the slidable sleeve; ball bearings between the flange of the rotatable head and slidable sleeve; a plurality of blades lodged respectively in the slots of the spindle having an inclined edge extending into the inclined grooves of the sleeve with a cutting edge at the end of the blades, adapted to cut a counter-bore; a nut screwed upon the end of the spindle.

In testimony whereof, I sign this specification.

HOWARD E. JAYNES.